(No Model.)

W. R. CORLETT.
VEHICLE SPRING.

No. 301,480. Patented July 8, 1884.

Witnesses.
F. R. Tibbitts.
E. W. Laird.

Inventor.
William R. Corlett,
By Geo. W. Tibbitts Atty.

UNITED STATES PATENT OFFICE.

WILLIAM R. CORLETT, OF CLEVELAND, OHIO.

VEHICLE-SPRING.

SPECIFICATION forming part of Letters Patent No. 301,480, dated July 8, 1884.

Application filed April 9, 1884. (No model.)

*To all whom it may concern:*

Be it known that I, WILLIAM R. CORLETT, of Cleveland, in the county of Cuyahoga and State of Ohio, have invented certain new and useful Improvements in Elliptic Springs, of which the following is a specification.

This invention relates to elliptic springs; and it consists in uniting the ends of the spring by means of a shackle or link joint, the object being to render the joint less rigid and give greater freedom for play of the joint with less friction, resulting in the production of an improved spring for vehicles, making the riding in vehicles having these springs more pleasant and agreeable.

Figure 2:
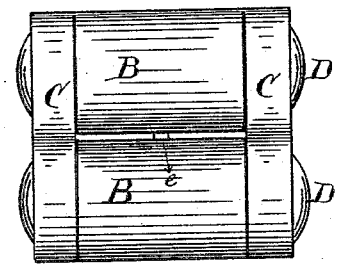
Figure 1:
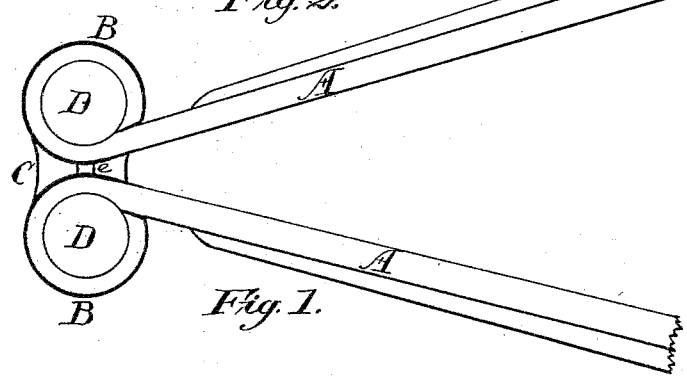
Figure 3:
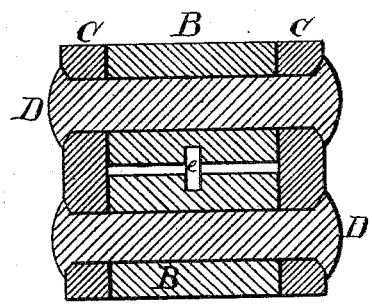

In the accompanying drawings, Figure 1 is a side elevation of the joint for elliptic springs embodying my improvement. Fig. 2 is an end view of the same. Fig. 3 is a vertical section through said joint, showing construction.

A A are the leaves of an elliptic spring, each of which is provided with a full complete eye or scroll, B B. C C are two links, placed one on each side of the scrolls, and through which and the scrolls are placed bolts or rivets D D. Between the said leaves A A, and midway between the links, is placed a pin, $e$, set in recesses made in the said leaves, and is designed to prevent any lateral motion of one leaf opposed to the other to prevent friction and wear.

The joint constructed as described possesses greater strength and durability and allows the spring to work much easier than the old and common knuckle-joint.

Having described my invention, I claim—

The herein-described improvement in elliptic springs, consisting of the two scrolls B B on the leaves A A, the two links C C, bolts or rivets D D, and the pin $e$, shown and described.

W. R. CORLETT.

Witnesses:
M. G. NORTON,
GEO. W. TIBBITTS.